United States Patent [19]
Frank et al.

[11] 4,439,332
[45] Mar. 27, 1984

[54] STABLE EMULSION COPOLYMERS OF ACRYLAMIDE AND AMMONIUM ACRYLATE FOR USE IN ENHANCED OIL RECOVERY

[75] Inventors: Simon Frank, Stamford; Anthony T. Coscia, South Norwalk; Joseph M. Schmitt, Ridgefield, all of Conn.

[73] Assignee: American Cyanamid Company, Stamford, Conn.

[21] Appl. No.: 99,962

[22] Filed: Dec. 3, 1979

Related U.S. Application Data

[63] Continuation-in-part of Ser. No. 933,225, Aug. 14, 1978, abandoned.

[51] Int. Cl.$^3$ .............................................. E21B 43/22
[52] U.S. Cl. ............................... 252/8.55 D; 166/275; 523/336; 524/340
[58] Field of Search .................. 252/8.55 D; 166/274, 166/275

[56] References Cited

U.S. PATENT DOCUMENTS

| | | | |
|---|---|---|---|
| 3,624,019 | 11/1971 | Anderson et al. | 252/8.55 X |
| 3,724,547 | 4/1973 | Bott | 166/274 |
| 3,804,173 | 4/1974 | Jennings | 166/275 |
| 3,852,234 | 12/1974 | Venema | 260/29.6 H |
| 4,022,731 | 5/1977 | Schmitt | 260/29.6 H X |
| 4,034,809 | 7/1977 | Phillips et al. | 166/270 |
| 4,137,969 | 2/1979 | Phalangas et al. | 166/275 |

*Primary Examiner*—Herbert B. Guynn
*Attorney, Agent, or Firm*—Gordon L. Hart

[57] ABSTRACT

There is provided a process for recovering oil from oil bearing formations employing the use of a water treating medium, which medium comprises the inclusion of a novel stable emulsion copolymer of acrylamide and ammonium acrylate as well as the emulsion copolymer per se.

6 Claims, No Drawings

STABLE EMULSION COPOLYMERS OF ACRYLAMIDE AND AMMONIUM ACRYLATE FOR USE IN ENHANCED OIL RECOVERY

This application is a continuation-in-part of our copending application, Ser. No. 933,225, filed Aug. 14, 1978, now abandoned.

The present invention relates to the secondary recovery of oil from subterranean formations. More particularly, it relates to an improved water flooding process utilizing a stable emulsion copolymer of acrylamide and ammonium acrylate.

Water flooding techniques are well known to increase the yield of a partially depleted oil bearing formation. One such technique is to introduce various viscosity-increasing additives into an aqueous water-flooding medium. Unfortunately, the addition of viscosity-increasing additives is not wholly satisfactory, since significant increases in oil yield are not uniformly obtained. Attention is directed to U.S. Pat. No. 4,034,809, issued to Phillips et al on July 12, 1977, which discloses the use of certain hydrolyzed water-in-oil emulsions as additives to water flooding media. If an additive could be provided to increase oil production significantly, such would meet a need long sought for in the art.

It is, therefore, a principal object of the invention to provide a stable emulsion copolymer which has improved reservoir sweep characteristics for use as a water-flooding additive. It is a further object of the invention to utilize an emulsion copolymer which substantially increases the yield of oil recovery in subterranean formations. Other objects will become apparent from a reading of the ensuing description.

To these ends, it has been unexpectedly found that markedly superior flow properties leading to enhanced oil recovery are attained by providing an acrylamide/ammonium acrylate copolymer emulsion, hereinafter defined, as the additive in a water flooding medium.

According to the process of the invention, there is provided a process for recovering oil from subterranean oil-bearing formations by introducing through a well bore into the latter formations a treating medium comprising an acrylamide-ammonium acrylate copolymer prepared by the emulsion polmerization of a mixture of acrylamide and ammonium acrylate in the presence of a suitable catalyst. Emulsion and dissolution procedures are disclosed in U.S. Pat. No. 4,022,731, which patent is incorporated herein by reference.

In general, a suitable water-in-oil emulsion useful in a water flooding menstruum or solution is in the form of a dispersion of finely-divided polymer particles, the emulsion comprising:

(1) an aqueous phase ranging from about 70% to about 95%, by weight based on the total weight of (1) and (2) which is comprised of:
  (a) a water-soluble copolymer of acrylamide and ammonium acrylate in an amount ranging from about 27% to about 68% of copolymer, by weight, based on the total weight of (1), and wherein the copolymer possesses a molecular weight of at least one million and comprises between about 50% and about 75% acrylamide and from 25% to about 50% ammonium acrylate, said acrylate being derived from the neutralization to a pH about 7.0 of acrylic acid and ammonia or ammonium hydroxide, (2) a liquid hydrocarbon oil in an amount ranging from about 5% to about 30%, by weight, based on the total weight of (1) and (2), (3) a water-in-oil emulsifying agent dispersed between said aqueous phase and said liquid hydrocarbon at a concentration ranging from about 0.1% to about 15.0%, by weight, based on the total weight of (1), (2) and (3), and optionally, (4) an inverting surfactant of the hydrophilic type, such as an ethoxylated octyl or nonyl phenol.

In a preferred embodiment, the copolymer can be prepared by dissolving acrylamide with the comonomer in water to attain the desired solids concentration. A suitable chelating agent, such as ethylenediaminetetraacetic acid disodium salt, may then be added to chelate metal ions which may be present in the system, such as those which may have been incorporated into the acrylamide during its production. Substantially complete neutralization to a pH of about 7.0, and usually between about 6.5 and about 7.5, of the acrylic acid with ammonia or ammonium hydroxide follows. The oxidant part of the redox catalyst system as discussed below is preferably added to the aqueous phase at this time, or even at a later stage, or as described below.

After the aqueous phase has been formed as above, it is homogenized into the oil phase, which phase constitutes a solution of the oil and a water-in-oil emulsifier. Any known oil for this purpose may be used. A preferred oil useful for this purpose is a commercially available product sold by Union Oil Company of California under the trademark "AMSCO OMS". It is a clear, oily liquid comprising approximately 86.9% paraffins, 13.0% naphthenes and 0.1% aromatics. It has a mlecular weight of about 170, Specific Gravity of 0.755 at 60° F., a Viscosity of 1.4 cps. at 77° F., a Freezing Point below −25° F., a Boiling Point of 399° F., a Flash Point of 126° F. and is insoluble in water. Its Specific Heat is 0.499 BTU/16° F. at 100° F. and 0.588 BTU/16° F. at 200° F.

Any available water-in-oil emulsifier may be employed, particularly those set forth in U.S. Pat. No. 4,022,731. A preferred emulsifier is sorbitan monooleate.

After the water-in-oil emulsion is formed by agitation of the oil and water phases to insure uniform blending, the oxidant part of the redox catalyst system may be added, if it has not been added previously as described above. This ingredient is added as an aqueous solution to the monomer emulsion, i.e., in an amount ranging from about 10 parts to about 1000 parts per million parts of monomers, preferably 25–250 ppm. Any redox catalyst system can be used herein such as a persulfate-sulfite system, the peroxide-sulfite system, the hydroperoxide-bisulfite system, and equivalents of the same. Additionally, other free-radical catalyst systems can be employed, e.g., azobisisobutyronitrile, benzoyl peroxide, lauroyl peroxide, potassium persulfate and the like as is known in the art. When the single component catalyst systems are employed, they are not added to the monomer emulsion until conversion of the monomers to polymer is desired. In a preferred aspect of this invention, however, the oxidant portion of a redox catalyst system, t-butyl hydroperoxide is added to the monomer emulsion first. The reducing portion of the redox catalyst should be employed in amounts ranging from about 10 ppm to about 500 ppm based on monomers, preferably 50–250 ppm.

It is found that to both stabilize and control the molecular weight of desired copolymer there are added small amounts of propylene glycol, usually from about 0.1% to about 10%, based on total monomer. For instance, when adding a high percentage of propylene glycol, there is obtained a lowering of the molecular weight of the resultant copolymer.

After the reaction mixture is prepared in the above manner, the system is then sparged with nitrogen gas to remove all oxygen from the system and the reducing portion of the catalyst system is then pumped into the monomer emulsion containing the oxidant portion of the catalyst over a period of from about 1 to about 20 hours, i.e., until substantially complete conversion is accomplished, preferably about 4–16 hours, the longer times being necessitated by heat exchange capacity and by the lower concentration of catalyst. The temperature of the reaction medium should be maintained at from about 25° C. to about 55° C. Resultant coplymers possess a molecular weight above about one million and are characterized as having a viscosity of from about 3 to about 6 centipoises from a 0.4% solution in 1 N sodium chloride at pH 8.0, the viscosity being obtained using a Brookfield viscosimeter equipped with a U.L. adapter, and employing spindle speed of 60 rpm.

In general, the inversion of the emulsion employed in the present invention can be accomplished by the addition of water when inverting surfactant is present. Alternatively, the inversion can be also accomplished by adding the abovedescribed inverting surfactant to a water emulsion mixture.

The hydrophilic ethoxylated octyl or nonyl phenol useful as the inverting surfactant comprises the reaction product of about one mole of octyl or nonyl phenol with from about 5–10 moles, preferably from about 6 to 8 moles, of ethylene oxide. Resultant ethoxylated octyl or nonyl phenol is employed in amounts ranging from about 1.5% to about 2.5%, by weight, preferably about 2.0%, by weight, based on the total weight of the emulsion, i.e., components (1), (2), (3) and (4), hereinabove defined.

The following examples are set forth for purposes of illustration only and are not to be construed as limitations on the present invention except as set forth in the appended claims. All parts and percentages are by weight unless otherwise specified.

EXAMPLE 1

This example illustrates the preparation of acrylamideammonium acrylate monomer emulsion.

To a suitable reaction vessel are added 1729 parts of acrylamide, as a 50.6% aqueous solution, 376.5 parts of glacial acrylic acid (99.6%) and 350 parts of deionized water. To the resultant solution are added 954.5 parts of ammonium hydroxide (29.1% $NH_3$) yielding a solution having a pH of 6.8. To this solution are added 44.5 parts of a 5.6% aqueous solution of the disodium salt of ethylenediaminetetraacetic acid and 156.6 parts of water. This mixture constitutes the aqueous monomer solution.

There is next prepared the oil phase by dissolving 109.5 parts of sorbitan monooleate in 1200 parts of AMSCO OMS, a commercially available clear oily liquid sold by Union Oil Co. of California.

The oil phase is stirred at high speed in a suitable vessel and the aqueous monomer solution as prepared above is slowly added thereto yielding a water-in-oil emulsion. This emulsion is further homogenized by passage through an homogenizer at 350 psig. Resultant monomer emulsion has a viscosity of 550 centipoises and a dispersed phase particle size of about 2.5 microns or less.

EXAMPLES 2–5

These examples illustrate the polymerization of the monomer emulsion prepared in Example 1.

To a suitable reaction vessel equipped with agitator, thermometer, gas inlet and outlet tubes, are added 806 parts of the above-prepared emulsion. The stirrer is started and 150 parts per million (based on total monomer) of t-butyl hydroperoxide catalyst are added to 100 parts of water. As set forth in the following table, varying amounts of propylene glycol are then added for the control of molecular weight of resultant copolymer:

TABLE I

| Example | Amt. of Added Propylene Glycol (Parts by weight) |
|---|---|
| 2 | 11.0 |
| 3 | 6.6 |
| 4 | 2.2 |
| 5 | <1.0 |

Resultant reaction medium is sparged with nitrogen gas to remove oxygen from the system. Stirring is continued and sodium metabisulfite solution (2.2 parts in 500 parts of water) is slowly pumped into the vessel over a period of five hours while maintaining the temperature at about 50° C., after which about 136 parts per million (based on monomer) of bisulfite are added. Resultant viscous emulsion exhibits a greater than 99% conversion of acrylamide and ammonium acrylate. Further stabilization of the copolymer emulsion is accomplished by the addition with stirring of concentrated ammonium hydroxide (29.1% $NH_3$) to raise the emulsion pH to about 8.5.

Sufficient ethoxylated nonyl phenol inverting agent (2.5%) as above defined can be added with agitation over a period of 30 minutes to the above emulsions.

Resultant copolymers are characterized by having molecular weights of at least one million and being further defined by a viscosity as summarized in the table below:

TABLE II

| Polymer | Viscosity (in cps*) | Mol. Weight |
|---|---|---|
| A (Ex. 2) | 3.3 | $4 \times 10^6$ |
| B (Ex. 3) | 4.4 | $7 \times 10^6$ |
| C (Ex. 4) | 5.2 | $10 \times 10^6$ |
| D (Ex. 5) | 6.0 | $15 \times 10^6$ |

*Cps means centipoises as measured for a 0.4% solution in 1N sodium chloride at pH = 8 by means of a Brookfield viscosimeter, UL adapter, spindle speed: 60 rpm.

EXAMPLE 6

This example illustrates the preparation of acrylamide ammonium acrylate monomer emulsion in which the acrylic acid is partially neutralized to a pH of 5 and then polymerized.

To a suitable reaction vessel are added 1729 parts of acrylamide, as a 50.6% aqueous solution, 376.5 parts of glacial acrylic acid (99.6%) and 350 parts of deionized water. To the resultant solution are added 630 parts of ammonium hydroxide (29.1% $NH_3$) yielding a solution having a pH of 5.0. To this solution are added 44.5 parts of a 5.6% aqueous solution of the disodium salt of ethylene diaminetetraacetic acid and 156.5 parts of water. This mixture constitutes the aqueous monomer solution.

There is next prepared the oil phase by dissolving 109.5 parts of sorbitan monooleate in 1200 parts of AMSCO OMS, a commercially available clear oily liquid sold by Union Oil Co. of California.

The oil phase is stirred at high speed in a suitable vessel and the aqueous monomer solution as prepared above is slowly added thereto yielding a water-in-oil emulsion. This emulsion is further homogenized by passage through an homogenizer at 350 psig. Resultant monomer emulsion has a viscosity of 550 centipoises and a dispersed phase particle size of about 2.5 microns or less.

Next, to a suitable reaction vessel equipped with agitator, thermometer, gas inlet and outlet tubes, are added 806 parts of the above-prepared emulsion. The stirrer is started and 150 parts per million (based on total monomer) of t-butyl hydroperoxide catalyst are added to 100 parts of water. Resultant reaction medium is then sparged with nitrogen gas to remove oxygen from the system. Stirring is continued and sodium metabisulfite solution (2.2 parts in 500 parts of water) is slowly pumped into the vessel over a period of five hours while maintaining the temperature at about 40° C., after which about 136 parts per million (based on monomer) of bisulfite are added. Resultant viscous emulsion exhibits a greater than 99% conversion of acrylamide and ammonium acrylate. Further stabilization of the copolymer emulsion is accomplished by the addition with stirring of concentrated ammonium hydroxide (29.1% NH$_3$) to raise the emulsion pH to about 8.5. Finally, ethoxylated nonyl phenol inverting agent (2.5%) as above defined is added with agitation over a period of 30 minutes to the above emulsion.

EXAMPLE 7

To demonstrate the effectiveness of the hereinabove described emulsions as water flooding additives, filtration-rate tests are carried out with the polymer solutions of Examples 2 to 5 employing a synthetic brine as the solvent.

In each of the tests, 2000 parts per million of emulsion polymer are added to the brine solvent and the solution is pumped through individual 47 millimeter diameter filter membranes usually of 0.8 or 1 micron, at a constant pressure of five pounds per square inch. The rate of passage of the solvent and polymer mixture is determined by collecting approximately 100 ml of filtrate and measuring the cumulative filtrate volume against time. The data obtained is summarized in Table III below as follows:

TABLE III

| Composition | Rate (ml/min) |
| --- | --- |
| Ex. 2 (Polymer A) | 91 |
| Ex. 3 (Polymer B) | 56 |
| Ex. 4 (Polymer C) | 19 |
| Ex. 5 (Polymer D) | 8 |

EXAMPLE 8

The procedure of Example 7 is repeated except that hydrolyzed polyacrylamide, rather than acrylamide-ammonium acrylate copolymer as hereinabove defined in Examples 2–5 is employed. The rate is markedly inferior, less than 4 ml/min. initially, with plugging of the membrane pores occurring after only 50 ml, or less, of filtrate have been collected.

EXAMPLE 9

This example illustrates the effect of partial neutralization of acrylic acid and resultant flow rate.

The procedure of Example 7 is repeated in every respect except that the acrylamide-ammonium acrylate copolymer as prepared in Example 6 above is employed. The rate is markedly inferior, less than 2 ml/min. initially, with plugging of the membrane pores occuring after only 40 ml, or less, of filtrate have been collected.

EXAMPLE 10

The procedure of Example 7 is repeated in every detail except that a copolymer of acrylamide and sodium acrylate, rather than acrylamide-ammonium acrylate copolymer as hereinabove defined in Examples 2–5, is employed. The rate is markedly inferior, less than 13 ml/min. initially, and plugging occurs when 64 ml are collected after 24 minutes.

EXAMPLE 11

Tests are carried out to define infectivity and mobility control properties in oil reservoir rock by injecting copolymer solutions of Examples 2 and 4 into Berea sandstone core plugs. The one-inch diameter x one-inch long core plugs are initially fired in a muffle furnace at 1000° F. for a period of four hours to stabilize the clays and clay-type minerals. Air permeability and porosity are determined on the dry plugs. Each plug is then evacuated and saturated with the injection brine containing 3625 ppm. sodium chloride and 375 ppm. calcium chloride. All flow tests are performed at ambient temperature (23° C.) and a flow rate of 3.0 ft/day. Liquid brine permeabilities for each plug are measured using the invention brine. Solutions of the polymer emulsion of Examples 2 and 4 comprising 500 ppm. copolymer in injection beine are then injected and the volumetric throughput and differential pressures are monitored. The mobility reduction or resistance factor is calculated using the following expression:

$$\text{mobility reduction} = \left(\frac{Q_w}{Q_p}\right)\left(\frac{\Delta P_p}{\Delta P_w}\right)$$

$Q_w$=flow rate through core during initial brine injection.

$Q_p$=flow rate through core during polymer injection.

$\Delta P_w$=pressure drop across core during initial brine injection.

$\Delta P_p$=pressure drop across core during polymer injection.

A summary of the data is given in Table IV below:

TABLE IV

INJECTIVITY & MOBILITY CONTROL PROPERTIES

| Polymer Product | Injection Brine Solution Copolymer Conc. (PPM) | Viscosity (cps) | Permeability, md. Air | Permeability, md. Brine | Porosity (%) | Resistance Factor After Specified Pore Volumes Injected 1 | 2 | 3 | 4 | 5 | 7 | 10 |
|---|---|---|---|---|---|---|---|---|---|---|---|---|
| Ex. 2 | 500 | 2.9 | 397 | 342 | 20.1 | 3.5 | 3.8 | 3.8 | 3.8 | 3.8 | 3.8 | 3.8 |
| Ex. 4 | 500 | 3.9 | 375 | 329 | 20.1 | 9.4 | 10.6 | 10.8 | 11.0 | 11.2 | 11.2 | 11.2 |
| PAM[1] | 500 | 3.0 | 381 | 354 | 20.1 | 6.2 | 7.8 | 8.4 | 9.0 | 9.4 | 10.1 | 11.0 |

[1] High mol. wt. hydrolyzed polyacrylamide, solid grade, commercially available for use in enhanced oil recovery polymer floods.

It will be seen from the above data that the polymers of the present invention are characterized by a rapid development of mobility control followed by a long term steady state condition indicative of no plugging and good propagation through the rock. In contrast thereto, hydrolyzed polyacrylamide solution developed mobility control gradually and exhibited a continually increasing resistance, indicative of poor propagation and eventual plugging of the rock.

EXAMPLE 12

This example illustrates enhanced oil recovery from oil-bearing cores employing the polymers of the instant invention and contrasting with a water flood per se on the same core.

Core samples of 1½ inches in diameter and 4 inches long are sealed in thin lead sleeves with stainless steel screens on the ends. The samples are cleaned and dried and their air permeability and porosity measured. Next, they are saturated with produced water (having 5331 ppm total dissolved solids) and their permeability to this water is measured. The samples are then flushed with filtered, centrifuged crude oil (viscosity 110 cps) until low water saturations are attained and their permeability to oil is measured. A waterflood is performed on each sample using Injection Water (having 3415 ppm total dissolved solids) injected at a constant rate of approximately 4 feet per day. Oil recovery and injection pressure are measured incrementally as a function of input volume. The samples are cleaned, reprepared as above, and flooded with polymer solutions. Results of these oil recovery tests are presented in Table V below:

TABLE V

Oil Recovery Tests

| | Test No. 1-Ex. 4 Water Flood | Test No. 1-Ex. 4 Polymer[1] Flood | Test No. 2-Ex. 3 Water Flood | Test No. 2-Ex. 3 Polymer[2] Flood |
|---|---|---|---|---|
| Permeability to air, md. | 970 | 1040 | 1190 | 1140 |
| Porosity | 33.8 | 31.1 | 32.1 | 30.7 |
| Oil in Place, % pore space | 66.3 | 68.0 | 65.7 | 71.9 |
| Residual Oil Saturation, % pore space | 35.6 | 21.9 | 31.9 | 18.4 |
| Oil Recovered at water breakthrough, % pore space | 3.9 | 20 | 4.5 | 22.8 |
| Oil Recovered at 0.5 pore volume | 14 | 30 | 18 | 34 |
| Oil Recovered at 1.0 pore volume | 17 | 34 | 22 | 38 |
| Oil Recovered at 99.9% water cut, % pore space | 30.7 | 46.1 | 33.8 | 53.5 |
| Oil Recovered at 99.9% water cut, bbl/acre ft. | 783 | 1115 | 844 | 1278 |

[1] A solution of 3200 ppm of product emulsion of Example 4 in injection water.
[2] A solution of 4000 ppm of product emulsion of Example 3 in injection water.

It is clear from the above that both copolymer solution of Examples 3 and 4 gave marked improvement in oil recvered over the corresponding water floods alone, yielding about double the amount of oil at 0.5 pore volume of injected solution.

EXAMPLE 13

This example illustrates the low copolymer retention properties of the copolymers of the present invention.

Sandpacks 1¾ inches in diameter and 18 inches long are prepared by packing the unconsolidated sand into rigid stainless steel tubes. Air permeability and porosity are measured. The samples were next saturated with Produced Water of Example 9 and their permeability to this water is measured. Next, they are flushed with filtered, centrifuged crude oil until a low water saturation is attained, and their permeability to oil is measured. A residual oil saturation is established by waterflooding the samples with Injection Water of Example 11, and the permeability to water at this saturation condition was measured. The sand pack is then injected with a solution containing 2000 ppm polymer product of Example 3 in Injection Water at a rate of 1.5 feet per day and a second sand pack is injected with a solution containing 2000 ppm of product of Example 4 in Injection Water at a rate of 1.4 feet per day, until effluent polymer concentrations greater than 95 percent of the injection concentration are observed. The samples are then injected at the same rate with solutions containing 4000 ppm of product of Example 4, respectively, until effluent polymer concentrations greater than 95 percent of the injection concentrations are again attained. Finally, Injection Water is injected into each sample until the effluent polymer concentrations approaches 5 ppm. Numerous small effluent samples are collected and analyzed for polymer content. Injection pressures are also measured.

Curves showing the effluent polymer concentration as a function of fluid injected are prepared and graphically integrated to determine the amount of polymer in the effluent (the area under the curve) at several points. Polymer retention values obtained are given in Table VI. The values are low compared to the values of 100-300 pounds per acre foot often reported for hydrolyzed polyacrylamide.

TABLE VI

Polymer Retention Data

| Product | Concentration (ppm) | Polymer Retention (lbs/acre-foot) |
|---|---|---|
| Polymer (Example 3) | 2000 | 48 |
| Polymer (Example 3) | 4000 | 60 |
| Polymer (Example 4) | 2000 | 24 |
| Polymer (Example 4) | 4000 | 44 |

We claim:

1. A process for recovering oil from a subterranean-oil-bearing formation which comprises: introducing through a well bore into said formation a stable, aqueous flooding menstruum comprising an acrylamide-ammonium acrylate copolymer having a molecular weight above about one million and recovering enhanced yields of oil therefrom, said copolymer being prepared in the form of an emulsion, said emulsion comprising:

(1) an aqueous phase constituting from 70% to about 95% of the total weight of (1) and (2) said aqueous phase comprising 40 to 73% by wt water and dissolved therein from 27% to 60% by weight of emulsion polymerized, water-soluble copolymer having a molecular weight of at least one million said copolymer consisting essentially of about 50% to 75% by wt of copolymerized acrylamide and about 25% to 50% by wt of copolymerized ammonium acrylate said copolymer being the product of emulsion polymerization in the aqueous phase of said emulsion, of acrylamide and ammonium acrylate comonomers, and said ammonium acrylate monomer being prepared by neutralizing acrylic acid in said aqueous phase with ammonium hydroxide to pH in the range from about pH 6.5 to about pH 7.5 before being copolymerized with acrylamide in said emulsion;

(2) a liquid hydrocarbon oil in an amount ranging from about 5% to about 30%, by weight, based on the total weight of (1) and (2), (3) a water-in-oil emulsifying agent disposed between said aqueous phase and said liquid hydrocarbon at a concentration of about 0.1% to 15.0%, by weight, based on the total weight of (1), (2) and (3), and optionally, (4) an inverting hydrophilic surfactant of an ethoxylated octyl or nonyl phenol, the amount of said ethoxylated octyl or nonyl phenol ranging from about 1.5% to about 2.5%, by weight, said weight being based on the total weight of (1), (2), (3) and (4).

2. The process according to claim 1 wherein the pH of the neutralized acrylic acid in step 1(a) is 6.8.

3. The process according to claim 1 wherein the molecular weight of the copolymer is $4 \times 10^6$.

4. The process according to claim 1 wherein the molecular weight of the copolymer is $7 \times 10^6$.

5. The process according to claim 1 wherein the molecular weight of the copolymer is $10 \times 10^6$.

6. The process according to claim 1 wherein the molecular weight of the copolymer is $15 \times 10^6$.

* * * * *